US012056744B2

(12) United States Patent
Bissex et al.

(10) Patent No.: US 12,056,744 B2
(45) Date of Patent: Aug. 6, 2024

(54) COMMERCE DRIVEN FEEDBACK MECHANISM FOR CONSUMER PRODUCTS

(71) Applicant: INTERNATIONAL BUSINESS MACHINES CORPORATION, Armonk, NY (US)

(72) Inventors: H. Ramsey Bissex, Irving, TX (US); Zachary James Goodman, Bedford, TX (US); Michael Bender, Rye Brook, NY (US); Jeremy R. Fox, Georgetown, TX (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 240 days.

(21) Appl. No.: 17/249,428

(22) Filed: Mar. 2, 2021

(65) Prior Publication Data

US 2022/0284486 A1    Sep. 8, 2022

(51) Int. Cl.
*G06Q 30/0282* (2023.01)
*G06N 20/00* (2019.01)
*G16Y 20/40* (2020.01)
*G16Y 40/20* (2020.01)
(Continued)

(52) U.S. Cl.
CPC ......... *G06Q 30/0282* (2013.01); *G06N 20/00* (2019.01); *G16Y 20/40* (2020.01); *G16Y 40/20* (2020.01); *H04L 9/0618* (2013.01); *H04L 9/50* (2022.05)

(58) Field of Classification Search
CPC .............................. G06Q 30/0282; H04L 9/50
See application file for complete search history.

(56) References Cited

U.S. PATENT DOCUMENTS

| 10,068,273 B2 | 9/2018 | Frehn | |
|---|---|---|---|
| 2014/0136362 A1* | 5/2014 | Shaya | G06Q 30/02 705/26.7 |
| 2014/0324490 A1 | 10/2014 | Gurin | |

(Continued)

FOREIGN PATENT DOCUMENTS

CN    105594842 B    4/2019

OTHER PUBLICATIONS

Violino, Simona et al. "Internet of Beer: A Review on Smart Technologies from Mash to Pint." Foods (Basel, Switzerland) vol. 9,7 950. Jul. 17, 2020, doi:10.3390/foods9070950 (Year: 2020).*

(Continued)

*Primary Examiner* — Gabrielle A McCormick
*Assistant Examiner* — Maame Ballou
(74) *Attorney, Agent, or Firm* — Elliot J. Shine

(57) ABSTRACT

A method, computer system, and a computer program product for cultivation feedback is provided. The present invention may include performing one or more parameter readings of one or more consumer products and storing the one or more parameter readings on a blockchain. The present invention may include determining a correlation between the one or more parameter readings and the one or more properties of the one or more consumer products. The present invention may include receiving feedback on the one or more consumer products from one or more users. The present invention may include providing one or more recommendations based on the feedback received.

16 Claims, 5 Drawing Sheets

(51) Int. Cl.
*H04L 9/06* (2006.01)
*H04L 9/00* (2022.01)

(56) References Cited

U.S. PATENT DOCUMENTS

| | | | |
|---|---|---|---|
| 2015/0235136 A1 | 8/2015 | Dillon | |
| 2017/0311559 A1 | 11/2017 | Ebert | |
| 2018/0168385 A1* | 6/2018 | Boone | G06Q 30/0621 |
| 2018/0285810 A1* | 10/2018 | Ramachandran | G06Q 10/087 |
| 2018/0314949 A1 | 11/2018 | Bender | |
| 2019/0236678 A1* | 8/2019 | Wilkinson | G06Q 30/0631 |
| 2019/0259108 A1 | 8/2019 | Bongartz | |
| 2020/0043156 A1 | 2/2020 | Fox | |
| 2020/0074278 A1 | 3/2020 | Santhar | |
| 2020/0117690 A1* | 4/2020 | Tran | G06F 16/90332 |
| 2020/0184489 A1 | 6/2020 | Negi | |
| 2021/0133670 A1* | 5/2021 | Cella | G06N 3/044 |

OTHER PUBLICATIONS

R. B. Somasagar and A. Kusagur, "Flavor Determination for Milk Quality Assessment using Embedded Electronic Noses," 2017 2nd International Conference On Emerging Computation and Information Technologies (ICECIT), Tumakuru, India, 2017, pp. 1-4, doi: 10.1109/ICECIT.2017.8453375 (Year: 2017).*

Helm, "Blockchain in Action: A Case Study in Coffee," Seattle Business Magazine, Jun. 2018 [accessed on Jan. 11, 2021], 6 pages, Retrieved from the Internet: <URL: https://seattlebusinessmag.com/technology/blockchain-action-case-study-coffee>.

IBM Food Trust, "A new era for the world's food supply," IBM. com, [accessed on Jan. 11, 2021], 14 pages, Retrieved from the Internet: <URL: https://www.ibm.com/blockchain/solutions/food-trust>.

Johnson et al., "Flavor-cyber-agriculture: Optimization of plant metabolites in an open-source control environment through surrogate modeling." PLoS One, Apr. 3, 2019, 16 pages, 14(4):e0213918, Jie Zhang, Newcastle University, UK, doi.org/10.1371/journal.pone. 0213918 Retrieved from the Internet: <URL: https://journals.plos.org/plosone/article?id=10.1371/journal.pone.0213918>.

Mell, et al., "The NIST Definition of Cloud Computing", National Institute of Standards and Technology, Special Publication 800-145, Sep. 2011, 7 pages.

Xiong, et al., "Blockchain Technology for Agriculture: Applications and Rationale," Frontiers in Blockchain, Feb. 2020 [accessed on Jan. 11, 2021], 7 pages, vol. 3, Article 7, DOI: 10.3389/fbloc.2020. 00007, ISSN: 2624-7852, Retrieved from the Internet: <URL: https://www.frontiersin.org/articles/10.3389/fbloc.2020.00007/full>.

* cited by examiner

COMMERCE DRIVEN FEEDBACK MECHANISM FOR CONSUMER PRODUCTS

BACKGROUND

The present invention relates generally to the field of computing, and more particularly to cultivating consumer products.

One or more factors, such as, but not limited to, soil content, weather, and harvest time, may contribute to the properties of consumer products. The properties of consumer products, such as, nutritional content, taste, and smell, can impact consumer satisfaction. It may be difficult for the producers of consumer products to determine how the one or more factors affect the properties of the consumer products.

Feedback from the consumers may assist the producers of consumer products in determining how better to control the one or more factors contributing to the properties of the consumer products they produce.

SUMMARY

Embodiments of the present invention disclose a method, computer system, and a computer program product for cultivation feedback. The present invention may include performing one or more parameter readings of one or more consumer products and storing the one or more parameter readings on a blockchain. The present invention may include determining a correlation between the one or more parameter readings and the one or more properties of the one or more consumer products. The present invention may include receiving feedback on the one or more consumer products from one or more users. The present invention may include providing one or more recommendations based on the feedback received.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
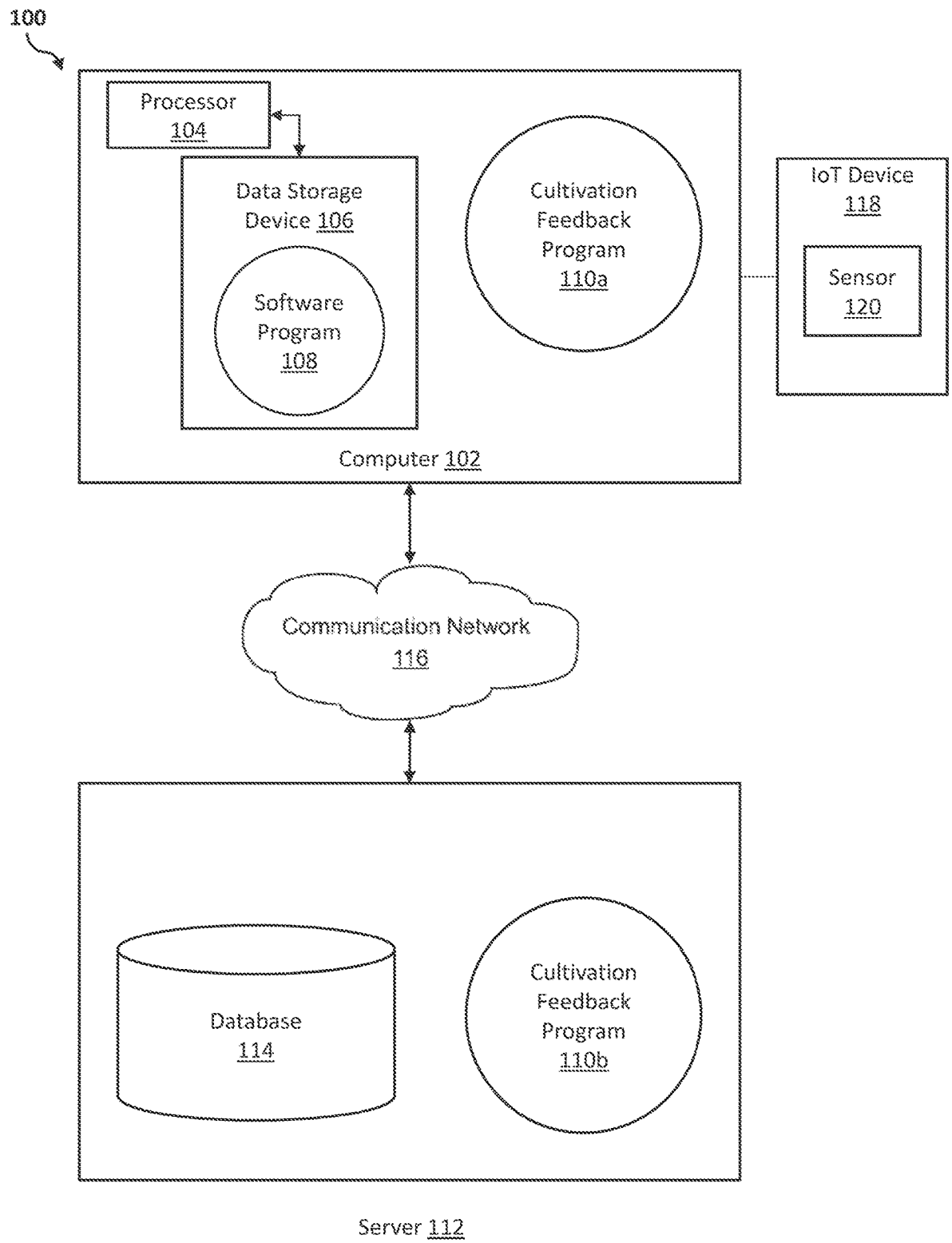
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for cultivation feedback. As such, the present embodiment has the capacity to improve the technical field of cultivating consumer products by providing instructive feedback to the producers of consumer goods enabling the producers to adjust cultivating practices to better address user preferences. More specifically, the present invention may include performing one or more parameter readings of one or more consumer products and storing the one or more parameter readings on a blockchain. The present invention may include determining a correlation between the one or more parameter readings and the one or more properties of the one or more consumer products. The present invention may include receiving feedback on the one or more consumer products from one or more users. The present invention may include providing one or more recommendations based on the feedback received.

As described previously, one or more factors, such as, but not limited to, soil content, weather, and harvest time, may contribute to the properties of consumer products. The properties of consumer products, such as, nutritional content, taste, and smell, can impact consumer satisfaction. It may be difficult for the producers of consumer products to determine how the one or more factors affect the properties of the consumer products.

Feedback from the consumers may assist the producers of consumer products in determining how better to control the one or more factors contributing to the properties of the consumer products they produce.

Therefore, it may be advantageous to, among other things, perform one or more parameter readings of one or more consumer products, determine a correlation between the one or more parameter readings and the one or more consumer products, receive feedback on the one or more consumer products from one or more users, and provide one or more recommendations based on the feedback received and the correlation between the one or more parameter readings and the one or more properties of the one or more consumer products.

According to at least one embodiment, the present invention may improve the production of consumer products aligned with consumer preferences by determining a correlation between one or more parameter readings and one or more properties of the one or more consumer products, receiving feedback on the one or more consumer products from one or more users, and providing recommendations based on the feedback received.

According to at least one embodiment, the present invention may improve the production of consumer products aligned with consumer preferences by providing one or more parameter adjustments to a producer of the one or more consumer products. The parameter adjustments provided to the producer allowing the producer to cultivate one or more consumer products aligned with consumer preferences.

According to at least one embodiment, the present invention may improve customer satisfaction with consumer products by recommending the best timing for consuming a consumer product to a user based on the properties of the consumer product and the preferences of the user.

According to at least one embodiment, the present invention may improve the production of consumer products by recommending a harvesting time to a producer based on predicted weather patterns and the weather patterns predicted impact on the one or more properties of the consumer product.

According to at least one embodiment, the present invention may improve consumer product tracking by using blockchain technology to store parameter readings recorded by one or more IoT devices that affect the properties of the one or more consumer products.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a cultivation feedback program 110a. The networked computer environment 100 may also include a server 112 that is enabled to run a cultivation feedback program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. The Client Computer 102 may be connected to an IoT (Internet of Things) Device 118, the IoT Device 118 may have a sensor 120. According to various implementations of the present embodiment, the cultivation feedback program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the cultivation feedback program 110a, 110b (respectively) to provide one or more recommendations based on feedback received on one or more consumer products. The cultivation feedback method is explained in more detail below with respect to FIG. 2.

Figure 2:
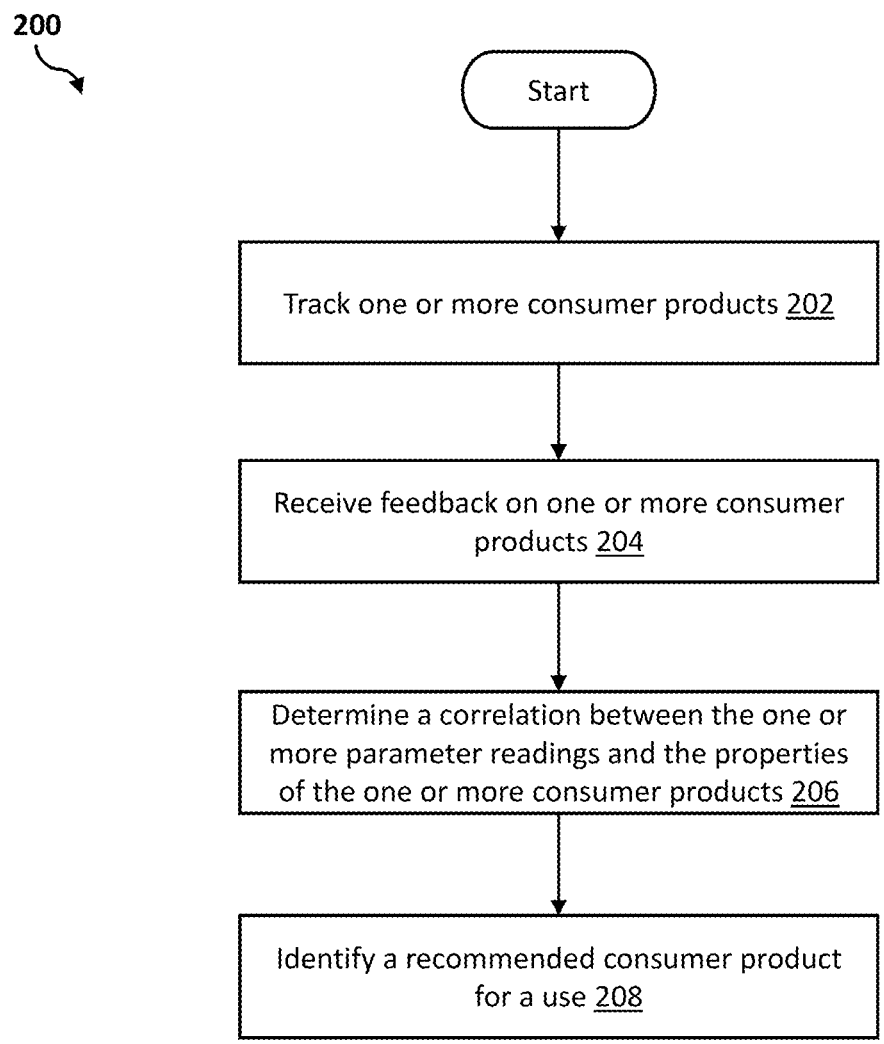
FIG. 2 is an operational flowchart illustrating a process for cultivation feedback according to at least one embodiment.

Referring now to FIG. 2, an operational flowchart illustrating the exemplary cultivation feedback process 200 used by the cultivation feedback program 110a and 110b (hereinafter cultivation feedback program 110) according to at least one embodiment is depicted.

At 202, the cultivation feedback program tracks one or more consumer products. The cultivation feedback program 110 may track a life cycle of the one or more consumer products. The life cycle of the one or more consumer products may include, but is not limited to including, production, processing, storage, and distribution. The cultivation feedback program 110 may utilize blockchain technology in storing data with respect to the life cycle of the one or more consumer products.

Blockchain technology may include a shared log (e.g., ledger) of transactions (i.e., records or events) that are kept in blocks of data that may be passed to the next transaction in a linear order. A block may contain the data of one or more records or transactions. A block may hold the data before the block has been completed, prior to consensus and prior to being transferred to the next block in a blockchain, for example, a transaction pool, a memory pool or a candidate block. In a blockchain network, the ledger is typically shared by all participants in the network. A shared ledger may allow the participants to access the data stored in the database. Although the blockchain data may be immutable, the database that stores the ledger may be available to shared participants.

A block may also be a block of one or more records or transactions attached to a blockchain, for example, a parameter reading performed by a sensor 120 of an IoT device 118 may be recorded to a block in a ledger.

The cultivation feedback program 110 may receive the data to be stored on the blockchain from one or more IoT devices 118 (e.g., IoT device 118). The IoT device 118 may be connected to at least one sensor 120 (e.g., multi-purpose IoT sensor, temperature sensor, humidity sensor, smell sensor, taste sensor, chemo sensors). The sensor 120 may perform one or more parameter readings, the one or more parameter readings may include, but are not limited to including, weather parameters, soil parameters, types of support provided during production (e.g., watering, fertilizer), harvesting details (e.g., date of harvest, ripeness at harvest, color of consumer product at harvest), types of preservation (e.g., pesticides used), transportation details (e.g., temperature of fridge or freezer, salt usage), amongst others. The parameter readings may be transmitted by the IoT device to the blockchain and stored for each of the one or more consumer products.

Parameter readings may be measurements of factors that may impact the properties of a consumer product. The properties of a consumer product may include, but are not limited to including, taste, smell, nutritional content, amongst others. For example, the properties (e.g., taste, smell, nutritional content) of a consumer product such as wine may vary based on the weather parameters and soil parameters in which the grapes used to produce the wine are cultivated in. The blockchain may be used to store the weather parameters and soil parameters of the grapes as well as track those grapes through the process of producing the wine and eventually to the consumer. As will be explained in more detail below, the cultivation feedback program 110 may receive feedback on the consumer product, in this example, wine. The consumer feedback may be utilized to determine the relationship of the properties (e.g., taste, smell, nutritional content) of the consumer product and the parameter readings performed by the sensor 120 of the IoT device 118.

The cultivation feedback program 110 may also utilize the sensor of the IoT device to detect odors or flavors of the one or more consumer products. The cultivation feedback program 110 may utilize an electronic nose in order to detect odors of the one or more consumer products. The cultivation feedback program 110 may utilize a multichannel taste sensor in order to detect the flavor of the one or more consumer products. The multichannel taste sensor may be comprised of several lipid or polymer membranes for transforming information about the one or more consumer products taste into electrical signals, the electrical signals being stored on the blockchain.

At 204, the cultivation feedback program receives feedback on the one or more consumer products. The cultivation feedback program 110 may receive feedback on the one or more consumer products from a user. The user may utilize a mobile application in providing the cultivation feedback program 110 feedback on the one or more consumer products.

The cultivation feedback program 110 may utilize the mobile application to present one or more prompts to the user based on the one or more consumer products purchased by the user. The one or more prompts may request the user to rate the properties of the consumer product such as taste and smell. The cultivation feedback program 110 may store feedback received from the user in a customer preference database and a knowledge corpus. The customer preference database, as will be explained in more detail below, may be utilized to recommend one or more consumer products to the user in the future. The knowledge corpus (e.g., database 114), as will be explained in more detail below, may be utilized to provide feedback to producers of the one or more consumer products.

The cultivation feedback program 110 may utilize a taste testing to receive feedback on the one or more consumer products. The cultivation feedback program 110 may store feedback received from the taste testing in the knowledge corpus 114 (e.g., database 114).

The cultivation feedback program 110 may receive feedback on the one or more consumer products by a cognitive analysis of speech, monitoring the amount of the consumer product ingested, monitoring the expressions of the user while ingesting the consumer product.

For example, a user may purchase one or more consumer products at a grocery store or other supplier. The grocery store may have a mobile application in which the user has a profile that stores the one or more consumer products purchased by the user. The one or more consumer products being tracked by on the blockchain using a traceability system such as, but not limited to, Radio Frequency Identification (RFID), and the blockchain storing the one or more parameter readings of the IoT device for the one or more consumer products purchased by the user. The mobile application may present the user a prompt to rate the taste of a consumer product such as a strawberry. The user may provide feedback such as, the strawberries were an overall 3 out of 5 and too sweet. As will be explained in more detail below, the cultivation feedback program 110 may utilize this user feedback to recommend strawberries to user in the future and provide feedback to producers of strawberries with respect to user preferences.

At 206, the cultivation feedback program determines a correlation between the one or more parameter readings and the properties of the one or more consumer products. The cultivation feedback program 110 may utilize a machine learning model in determining the correlation between the one or more parameter readings and the properties of the one or more consumer products.

The machine learning model may utilize one or more algorithms, such as, but not limited to, decision trees, association rule learning, k nearest neighbor, in determining a correlation between the one or more parameter readings (e.g., weather parameters, soil parameters, types of support provided during production, harvesting details, types of preservation, transportation details) and the properties (e.g., taste, smell, nutritional content) of a consumer product.

The cultivation feedback program 110 may utilize the correlation between the one or more parameter readings and the properties of the consumer product to provide feedback to the producers of the one or more consumer products based on feedback received and stored in the knowledge corpus 114 (e.g., database 114). The cultivation feedback program 110 may provide feedback to the producers of the one or more consumer products by region. The cultivation feedback program 110 may identify local preferences in providing feedback to the producers of the one or more consumer products. The local preferences may be determined from one or more users of a specific region. The specific region may include, but is not limited to including, a defined geographic region or a supplier (e.g., store, grocery store).

For example, the cultivation feedback program 110 may determine that there is a correlation between the soil parameters and the sweetness of strawberries. The cultivation feedback program may also determine the preferred level of sweetness by users for strawberries based on the user feedback stored in the knowledge corpus (e.g., database 114). The cultivation feedback program 110 may provide feedback to the producers of strawberries with respect to the soil parameters in order to allow the producers to cultivate a more favorable strawberry. The cultivation feedback program 110 may continue to provide feedback to the producers based on the feedback received from users.

At 208, the cultivation feedback program 110 identifies a recommended consumer product for a user. The cultivation feedback program 110 may identify the recommended consumer product for the user based on a machine learning model. The machine learning model may utilize the customer preference database and the data stored on the blockchain to identify the recommended consumer product for the user.

The cultivation feedback program 110 may display the recommended consumer product to the user. The cultivation feedback program 110 may display the recommended consumer product to the user using the mobile application. The cultivation feedback program 110 may display a timeline of when the recommended consumer product will be suitable to the user based on the customer preference database. The timeline may be a period of time such as the time between two calendar dates. The calendar dates may be displayed to the user on the mobile application.

For example, the user may have provided feedback on one or more previous purchases. The cultivation feedback program 110 using the data stored on the blockchain for the one or more consumer products in a store may identify the recommended consumer product for the user. The recommended consumer product having parameter readings that correspond to the customer preference database. The user may provide feedback through the mobile application on the recommended consumer product and the cultivation feedback program 110 may retrain the machine learning model based on the feedback received from the user.

It may be appreciated that FIG. 2 provides only an illustration of one embodiment and do not imply any limitations with regard to how different embodiments may be implemented. Many modifications to the depicted embodiment(s) may be made based on design and implementation requirements.

Figure 3:
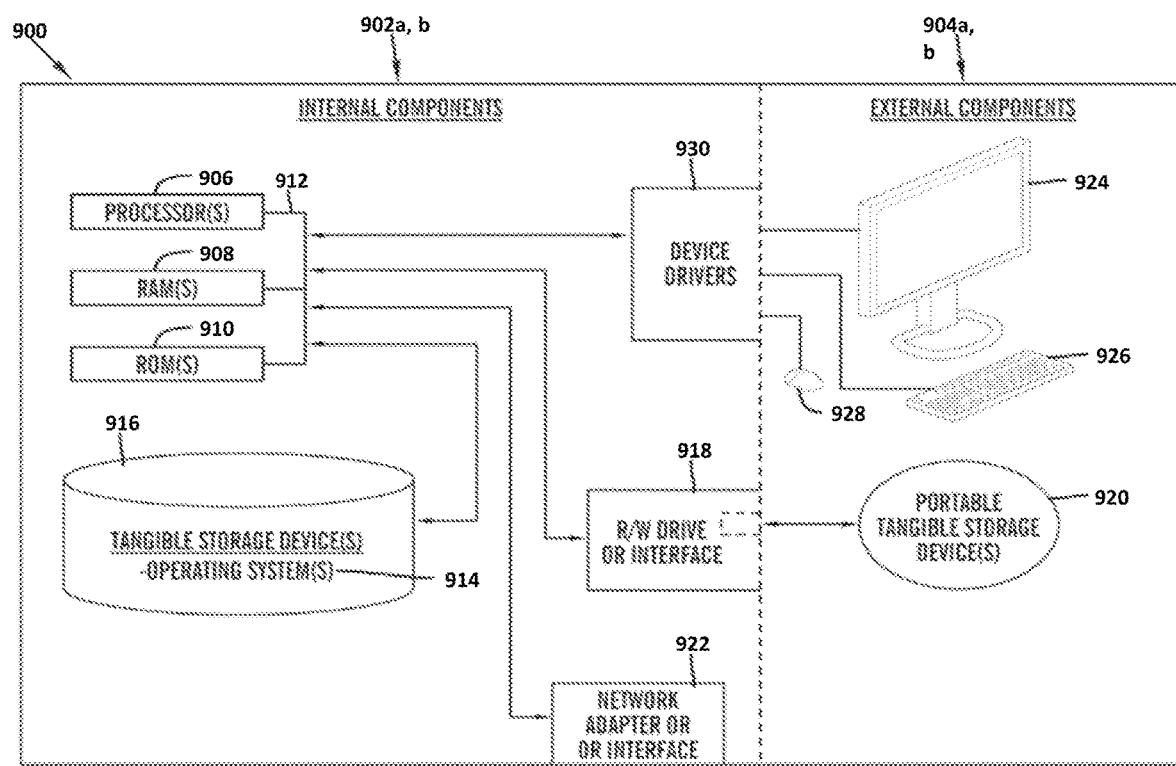
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 3. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the cultivation feedback program 110a in client computer 102, and the cultivation feedback program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the cultivation feedback program 110a and 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the cultivation feedback program 110a in client computer 102 and the cultivation feedback program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the cultivation feedback program 110a in client computer 102 and the cultivation feedback program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
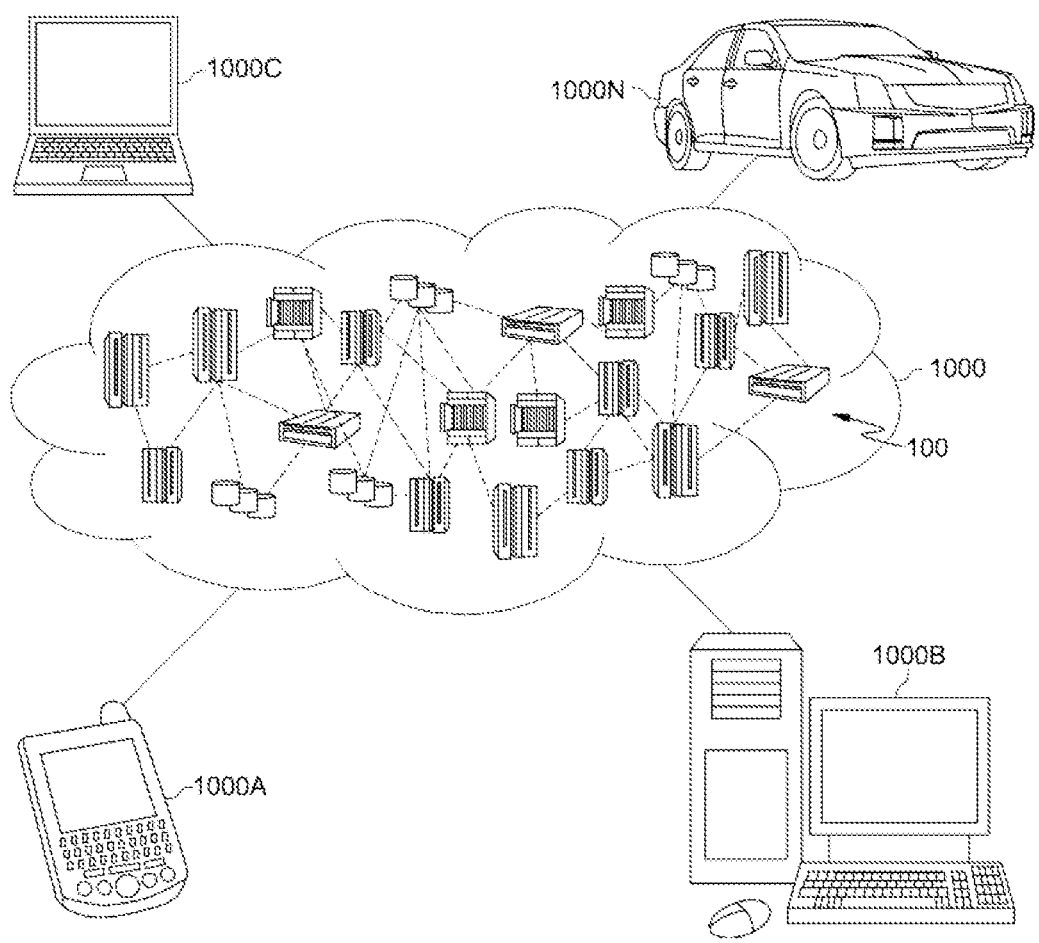
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
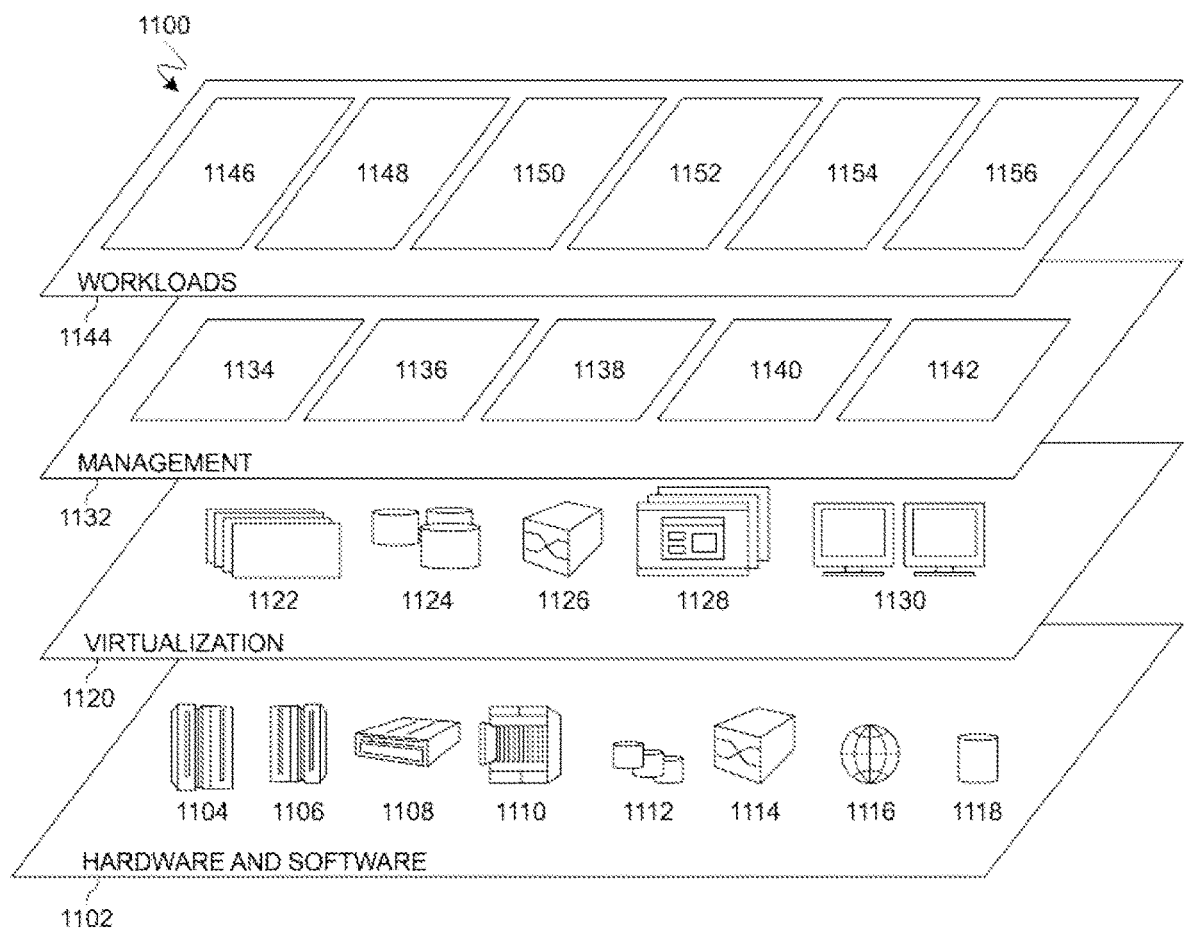
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and cultivation feedback 1156. A cultivation feedback program 110a, 110b provides a way to provide recommendations to the producers and users of consumer products to improve user satisfaction with consumer products.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for cultivation feedback, the method comprising:
performing one or more parameter readings of one or more consumer products and storing the one or more parameter readings on a blockchain, wherein the one or more parameter readings are performed using a sensor of an Internet of Things (IOT) device, wherein the IoT device transmits the one or more parameter readings to the blockchain, and wherein the one or more parameter readings stored on the blockchain are associated with the one or more consumer products using a Radio Frequency Identification traceability system;
determining a correlation between the one or more parameter readings and one or more properties of the one or more consumer products using a machine learning model, wherein the machine learning model utilizes association rule learning to determine the correlation between the one or more parameter readings and the one or more properties of the one or more consumer products;
receiving feedback on the one or more consumer products from one or more users in a mobile application, wherein the feedback is received in response to one or more prompts presented to each of the one or more users in the mobile application;
storing the feedback received from the one or more users in a customer preference database and a knowledge corpus, wherein the feedback stored in the customer preference database is utilized to recommend one or more new consumer products to at least one of the one or more users and the feedback stored in the knowledge corpus is utilized to recommend one or more parameter adjustments to a producer of the one or more consumer products;
identifying a recommended consumer product for a user using the machine learning model and the feedback stored in the customer preference database by associating the one or more consumer products within a store with the one or more parameter readings stored on the blockchain using the Radio Frequency Identification traceability system;
providing one or more recommendations in the mobile application, wherein the one or more recommendations includes at least displaying the recommended consumer product to the user in the mobile application using a timeline, wherein the timeline is a period of time between two calendar dates in which the recommended consumer product is suitable to the user based on the customer preference database; and
retraining the machine learning model based on a user response to the recommended consumer product, wherein the user response is utilized to update the feedback stored in the customer preference database and the knowledge corpus which refines the machine learning model.

2. The method of claim 1, wherein providing the one or more recommendations based on the feedback received from the one or more users further comprises:
identifying users from a specific geographic region;
determining one or more parameter adjustments that correspond to one or more adjustments in the one or more properties of the one or more consumer products that align with the feedback stored in the knowledge corpus for the users from the specific geographic region; and
providing the one or more parameter adjustments based on local preferences to the producer of the one or more consumer products for the specific geographic region.

3. The method of claim 2, wherein at least one of the one or more parameter adjustments provided to the producer is designed to adjust a taste of the one or more consumer products towards the local preferences of the specific geographic region.

4. The method of claim 1, wherein the sensor of the IOT device includes an electronic nose for detecting odors of the one or more consumer products and a multichannel taste sensor in order to detect a flavor of the one or more consumer products, wherein the multichannel taste sensor is comprised of several lipid or polymer membranes for transforming taste information about the one or more consumer products into electrical signals, the one or more properties of the one or more consumer products being stored on the blockchain.

5. The method of claim 1, wherein the one or more parameter readings are measurements of factors that impact the properties of the one or more consumer products, wherein the properties of the one or more consumer products include at least, one or more of, taste, smell, or nutritional content.

6. The method of claim 1, wherein at least one of the one or more parameter readings is for soil parameters and at least one of the one or more properties is for taste of the one or more consumer products.

7. The method of claim 1, wherein the one or more prompts request each of the one or more users to rate the one or more properties of a purchased consumer product, including at least a taste rating for the purchased consumer product.

8. The method of claim 1, wherein the one or more recommendations are determined by the machine learning model based on feedback stored in the customer preference database or the knowledge corpus and the correlation between the one or more parameter readings and the one or more properties of the one or more consumer products.

9. A computer system for cultivation feedback, comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
performing one or more parameter readings of one or more consumer products and storing the one or more parameter readings on a blockchain, wherein the one or more parameter readings are performed using a sensor of an Internet of Things (IOT) device, wherein the IoT device transmits the one or more parameter readings to the blockchain, and wherein the one or more parameter readings stored on the blockchain are associated with the one or more consumer products using a Radio Frequency Identification traceability system;

determining a correlation between the one or more parameter readings and one or more properties of the one or more consumer products using a machine learning model, wherein the machine learning model utilizes association rule learning to determine the correlation between the one or more parameter readings and the one or more properties of the one or more consumer products;

receiving feedback on the one or more consumer products from one or more users in a mobile application, wherein the feedback is received in response to one or more prompts presented to each of the one or more users in the mobile application;

storing the feedback received from the one or more users in a customer preference database and a knowledge corpus, wherein the feedback stored in the customer preference database is utilized to recommend one or more new consumer products to at least one of the one or more users and the feedback stored in the knowledge corpus is utilized to recommend one or more parameter adjustments to a producer of the one or more consumer products;

identifying a recommended consumer product for a user using the machine learning model and the feedback stored in the customer preference database by associating the one or more consumer products within a store with the one or more parameter readings stored on the blockchain using the Radio Frequency Identification traceability system;

providing one or more recommendations in the mobile application, wherein the one or more recommendations includes at least displaying the recommended consumer product to the user in the mobile application using a timeline, wherein the timeline is a period of time between two calendar dates in which the recommended consumer product is suitable to the user based on the customer preference database; and retraining the machine learning model based on a user response to the recommended consumer product, wherein the user response is utilized to update the feedback stored in the customer preference database and the knowledge corpus which refines the machine learning model.

10. The computer system of claim 9, wherein providing the one or more recommendations based on the feedback received from the one or more users further comprises:

identifying users from a specific geographic region;

determining one or more parameter adjustments that correspond to one or more adjustments in the one or more properties of the one or more consumer products that align with the feedback stored in the knowledge corpus for the users from the specific geographic region; and providing the one or more parameter adjustments based on local preferences to the producer of the one or more consumer products for the specific geographic region.

11. The computer system of claim 9, wherein the sensor of the IoT device includes an electronic nose for detecting odors of the one or more consumer products and a multichannel taste sensor in order to detect a flavor of the one or more consumer products, wherein the multichannel taste sensor is comprised of several lipid or polymer membranes for transforming taste information about the one or more consumer products into electrical signals, the one or more properties of the one or more consumer products being stored on the blockchain.

12. The computer system of claim 9, wherein the one or more recommendations are determined by the machine learning model based on feedback stored in the customer preference database or the knowledge corpus and the correlation between the one or more parameter readings and the one or more properties of the one or more consumer products.

13. A computer program product for consumer feedback, comprising:

one or more non-transitory computer-readable storage media and program instructions stored on at least one of the one or more tangible storage media, the program instructions executable by a processor to cause the processor to perform a method comprising:

performing one or more parameter readings of one or more consumer products and storing the one or more parameter readings on a blockchain, wherein the one or more parameter readings are performed using a sensor of an Internet of Things (IOT) device, wherein the IoT device transmits the one or more parameter readings to the blockchain, and wherein the one or more parameter readings stored on the blockchain are associated with the one or more consumer products using a Radio Frequency Identification traceability system;

determining a correlation between the one or more parameter readings and one or more properties of the one or more consumer products using a machine learning model, wherein the machine learning model utilizes association rule learning to determine the correlation between the one or more parameter readings and the one or more properties of the one or more consumer products;

receiving feedback on the one or more consumer products from one or more users in a mobile application, wherein the feedback is received in response to one or more prompts presented to each of the one or more users in the mobile application;

storing the feedback received from the one or more users in a customer preference database and a knowledge corpus, wherein the feedback stored in the customer preference database is utilized to recommend one or more new consumer products to at least one of the one or more users and the feedback stored in the knowledge corpus is utilized to recommend one or more parameter adjustments to a producer of the one or more consumer products;

identifying a recommended consumer product for a user using the machine learning model and the feedback stored in the customer preference database by associating the one or more consumer products within a store with the one or more parameter readings stored on the blockchain using the Radio Frequency Identification traceability system;

providing one or more recommendations in the mobile application, wherein the one or more recommendations includes at least displaying the recommended consumer product to the user in the mobile application using a timeline, wherein the timeline is a period of time between two calendar dates in which the recommended consumer product is suitable to the user based on the customer preference database; and retraining the machine learning model based on a user response to the recommended consumer product, wherein the user response is utilized to update the feedback stored in the customer preference database and the knowledge corpus which refines the machine learning model.

14. The computer program product of claim 13, wherein providing the one or more recommendations based on the feedback received from the one or more users further comprises:
- identifying users from a specific geographic region;
- determining one or more parameter adjustments that correspond to one or more adjustments in the one or more properties of the one or more consumer products that align with the feedback stored in the knowledge corpus for the users from the specific geographic region; and
- providing the one or more parameter adjustments based on local preferences to the producer of the one or more consumer products for the specific geographic region.

15. The computer program product of claim 13, wherein the sensor of the IoT device includes an electronic nose for detecting odors of the one or more consumer products and a multichannel taste sensor in order to detect a flavor of the one or more consumer products, wherein the multichannel taste sensor is comprised of several lipid or polymer membranes for transforming taste information about the one or more consumer products into electrical signals, the one or more properties of the one or more consumer products being stored on the blockchain.

16. The computer program product of claim 13, wherein the one or more recommendations are determined by the machine learning model based on feedback stored in the customer preference database or the knowledge corpus and the correlation between the one or more parameter readings and the one or more properties of the one or more consumer products.

\* \* \* \* \*